US006622541B2

(12) United States Patent
Stein et al.

(10) Patent No.: US 6,622,541 B2
(45) Date of Patent: Sep. 23, 2003

(54) ROLLOVER SLED TEST DEVICE AND METHOD

(75) Inventors: Douglas J. Stein, Oxford, MI (US); Michel P. Rossey, Rochester, MI (US); Analia U. Jarvis, Sterling Heights, MI (US); Michael G. Davis, Highland, MI (US); Jonas Bärgman, Göteborg (SE)

(73) Assignee: Autoliv ASP, Inc., Ogden, UT (US)

( * ) Notice: Subject to any disclaimer, the term of this patent is extended or adjusted under 35 U.S.C. 154(b) by 73 days.

(21) Appl. No.: 09/798,199

(22) Filed: Mar. 1, 2001

(65) Prior Publication Data

US 2002/0121144 A1 Sep. 5, 2002

(51) Int. Cl.[7] .............................................. G01M 17/00
(52) U.S. Cl. .................................... 73/12.04; 73/865.3
(58) Field of Search ................................. 73/1.75, 1.79, 73/1.37, 1.38, 1.39, 11.04, 12.01, 12.04, 12.05, 12.07, 12.09, 865.3, 865.6

(56) References Cited

U.S. PATENT DOCUMENTS

| D345,178 S | 3/1994 | Peterson |
| 5,345,402 A | 9/1994 | Gioutsos et al. |
| 5,368,484 A | 11/1994 | Copperman et al. |
| 5,483,845 A * | 1/1996 | Stein et al. ................ 73/12.01 |
| 5,485,758 A | 1/1996 | Brown et al. |
| 5,623,094 A | 4/1997 | Song et al. |
| 5,626,362 A | 5/1997 | Mottola |
| 5,743,562 A | 4/1998 | Mottola |
| 5,783,739 A | 7/1998 | Miller |
| 5,865,624 A | 2/1999 | Hayashigawa |
| 5,872,321 A * | 2/1999 | Yannaccone ................ 73/12.04 |
| 5,929,348 A | 7/1999 | Stein et al. |
| 5,931,739 A | 8/1999 | Layer et al. |
| 5,947,513 A | 9/1999 | Lehto |
| 6,018,130 A | 1/2000 | Haack et al. |
| 6,024,381 A | 2/2000 | Mottola |
| 6,256,601 B1 * | 7/2001 | Wipasuramonton et al. ... 703/7 |

* cited by examiner

Primary Examiner—Eric S. McCall
(74) Attorney, Agent, or Firm—Sally J. Brown; James D. Erickson

(57) ABSTRACT

The invention presents a sled device for testing the rollover threshold of a vehicle. The sled has a carriage that is mounted on a track. The carriage can slide upon the track from a first track location. The carriage is configured so that an actual vehicle may be placed on the carriage. When a vehicle is on the carriage, the vehicle is positioned with one side of the vehicle positioned toward the first tract location and the second side of the vehicle positioned toward the second track location. The carriage is propelled from the first tract location to the second track location by an accelerator. As the carriage nears the second track location, a decelerator slows and arrests the movement of the carriage, thereby simulating an impulse potentially sufficient to cause the vehicle to roll.

34 Claims, 6 Drawing Sheets

ROLLOVER SLED TEST DEVICE AND METHOD

BACKGROUND OF THE INVENTION

1. Field of the Invention

The present invention relates to a device for testing the rollover threshold of automobiles. More particularly, the present invention relates to a rollover sled test device which allows for the non destructive testing of an automobile's rollover threshold.

2. Technical Background

Rollover crashes are one of the most significant safety problems for all classes of light vehicles. The problem is especially acute for light trucks such as pickups, sport utility vehicles, and vans. According to one report, light trucks have more than 125 percent more rollover crashes per registered vehicle than passenger cars.

In recent years there have been an average of over a quarter million crashes per year where a rollover was the first harmful event. These rollover crashes result in an average of over 9,000 deaths per year and account for nearly thirty percent of all light vehicle fatalities. Over 200,000 people are injured in rollover crashes each year. Rollovers are second in severity only to frontal crashes.

Most rollovers result from the vehicle leaving the roadway and tripping. Two types of tripped rollovers exist, the soil trip rollover and the curb trip rollover. In the soil trip rollover, a vehicle first begins a lateral slide. As the car leaves the roadway, the tires drag in the soil, and the soil builds up near the tires creating a lip or mound of soil that trips the vehicle and causes a rollover. In the curb trip rollover, the vehicle begins a lateral slide until the wheels contact a curb or other solid, stationary object. The vehicle is tripped by the curb and thrown into a roll.

Vehicle safety is an important part designing and manufacturing a vehicle. Today most cars and trucks have a variety of safety features designed to avoid a crash and to protect the occupants in the unfortunate event of a crash. Devices such as anti-lock brakes help a driver avoid accidents by shortening the distance required to stop a vehicle. Seat belts reduce injury to vehicle occupants in the event of a crash and have been provided in vehicles for decades.

More recently, air bags and inflatable curtains have been installed to protect vehicle occupants in the event of a crash or rollover. The air bags and curtains use computerized and mechanical sensors installed in the vehicle to sense a crash and deploy the device. When the sensor detects a certain type of crash such as a frontal crash or rollover, the air bag or inflatable curtain is deployed protecting the vehicle occupants. If the air bag or inflatable curtain is errantly deployed the vehicle occupants may be injured by the forceful inflation of the safety device. Therefore, it is essential that the sensors be able to detect when a crash actually occurs that requires deployment of the safety device.

However, it is impossible to determine how a car or truck will perform in a crash without actual test data. Vehicle manufactures, consumer groups, and the government test vehicles in a variety of ways to determine vehicle safety and to improve the vehicle safety. In recent years vehicles have been tested in a variety of crash situations. For example, a vehicle may be accelerated down a track and crashed into a solid object such as a wall. The impact of the vehicle into the wall simulates a crash and damages the vehicle. The vehicle may be analyzed for its ability to protect of the driver and passengers from injury in this frontal crash scenario. The data obtained from the crash test simulation may also be used to design sensors to deploy safety devices such as air bags in the event of a frontal crash.

A few methods have been developed for testing the rollover threshold of a vehicle. For example, a car or light truck is subjected to a large lateral acceleration causing the vehicle to skid sideways on its tires. The vehicle then hits a tripping device such as a curb which throws the vehicle into a roll. In this manner a vehicle may be analyzed for its potential to roll and sensors designed to sense a rollover crash. However, this method of testing rollover threshold destroys the vehicle tested and is costly. Because the vehicle is destroyed, only one test can be run per vehicle which limits the amount of data that can be collected and analyzed. Moreover, it is difficult to obtain reproducible data because of the many variables involved in such a test.

A few non-destructive ways for testing the rollover threshold of a vehicle have been developed. Generally these methods comprise attaching stabilizing bars to the sides of the vehicle. The vehicle with the stabilizing bars is driven around a test course. The driver of the vehicle will attempt sharp turns at different speeds which may cause the vehicle to tip. If the vehicle begins to tip into the start of a rollover, the bars contact the ground preventing the completion of the roll. The usefulness of this type of rollover testing is limited, because the test is not capable of simulating the sliding and tripping that most often causes a rollover. Moreover, a driver will not perform the test in the same manner, making the results of the test difficult to reproduce.

Accordingly there is a need in the art for a method and apparatus for testing the rollover threshold of a vehicle. It would be a further advancement in the art if the method for testing the rollover threshold of a vehicle produced reproducible results. Moreover, the cost of rollover testing could be significantly reduced if the method for testing the rollover threshold of a vehicle were non-destructive.

BRIEF SUMMARY OF THE INVENTION

The present invention relates to a rollover sled test device which enables the determination of the rollover threshold of a vehicle. The sled has a carriage that travels on a track from a first track location to a second track location. The carriage is configured so that an actual vehicle can be positioned on the carriage. The vehicle is positioned on the carriage so that a first side of the vehicle faces the first track location and a second side of the vehicle faces a second track location.

An accelerator propels the carriage with the mounted vehicle from the first track location to the second track location. As the carriage nears the second track location, a decelerator abruptly slows and stops the carriage. The momentum of the vehicle continues to carry the vehicle in the direction of the second track location. If the rollover threshold of the vehicle is met, the vehicle may roll from the carriage. An observer may then determine the rollover threshold of the vehicle.

Because an actual vehicle with its own suspension is used, the sled test device allows an accurate simulation of how the vehicle will react under real world conditions. If a vehicle rolls from the sled test device, the vehicle will be severely damaged. Therefore, in certain embodiments, the vehicle may be tethered to the carriage. As the vehicle begins a roll, the tether allows the vehicle to tip and begin a roll, but prevents the destructive rolling of the vehicle from the carriage. If it is desired to test a vehicle's ability to protect occupants in a rollover event, the tether may be disconnected allowing the vehicle to roll.

In a presently preferred embodiment, one or more stops, positioned near the tires of a vehicle mounted on the carriage, are provided to simulate a curb, built-up soil, or other object that may initiate a roll of the vehicles in real world conditions. As the vehicle rapidly slows, the wheels impact the stops. The vehicle may then rotate about the stops a begin a rollover event. If the vehicle is tethered, the tethers will allow the vehicle to tip, but prevent the completion of the rollover.

A variety of devices and methods may be used to decelerate the carriage. For example in one presently preferred embodiment, a set of at least one pad is positioned on a deceleration track. More than one deceleration track may be used in certain embodiments to create an balanced deceleration on the carriage. As the carriage travels on the track, a latch on the carriage contacts the set of at least one pad, slowing carriage with the attached vehicle. The pads may be metallic, organic, or a composite of organic and metallic.

The pads may be configured to exert a pressure on the track. The pressure may vary from about 0 to about 1,000 PSI. The pressure of the pads on the track may be adjustable. In certain embodiments, the pads may be adjusted as a whole with a change in the pressure in one pad changing the pressure in all the pads. In other embodiments, the pad pressure of each pad may be independent of the pressure in other pads. Where two or more pads are used, the pads may be spaced on the deceleration track. In this manner the deceleration pulse generated by a first pad may be completed before the deceleration pulse of the second pad begins.

The deceleration track may be of a suitable length to allow for the deceleration of the carriage. In certain embodiments a deceleration track of about 6 meters in length may be suitable to properly decelerate the carriage and vehicle.

Other decelerators may be used to decelerate the carriage. Any one of the following non-exhaustive list of decelerators or a combination of decelerators may be used to slow and stop the carriage. The carriage may be decelerated by impacting the carriage into a bent metal bar pulled through a set of rollers. The carriage may also be decelerated by impacting the carriage into one or more springs either in tension or compression. One or more hydraulic syringes may be also used to slow the carriage, by impacting the carriage into the one ore more hydraulic syringes. Additionally, shock absorbers, such as one or more pneumatic or hydraulic shock absorbers may decelerate the carriage through impacting the carriage into the shock absorbers. It will be understood by those of skill in the art, any of the decelerators disclosed herein may be used in combination with the other decelerators disclosed herein or other decelerators.

The invention also relates to a method for employing the rollover sled test device. The method comprises positioning a vehicle on a carriage constructed in accordance with the present invention. The carriage may then be propelled from the first track location to the second track location. The carriage is decelerated to simulate a car sliding on a roadway. An additional step of tethering the vehicle may prevent the destruction of the vehicle and allow multiple test to be performed on the same vehicle. When the carriage includes one or more stops, the method may include impacting the vehicle into the stops.

Thus, the present invention presents a rollover sled test device that can determine the rollover threshold of a vehicle. The results produced from the sled test device are reproducible. Because an actual vehicle is used, the sled test device can more readily determine how a given vehicle will perform in real world conditions. Moreover, because the sled test device provides means to decelerate the carriage rapidly or slowly or with varying pulses, a large numbers of real world scenarios may be tested. Also, the cost of obtaining results using an actual vehicle is reduce by the non-destructive nature of the test when the vehicle is tethered to the carriage.

These and other features, and advantages of the present invention will become more fully apparent from the following description and appended claims, or may be learned by the practice of the invention as set forth hereinafter.

BRIEF DESCRIPTION OF THE SEVERAL VIEWS OF THE DRAWING

A more particular description of the invention summarized above will be rendered by reference to the appended drawings. These drawings only provide selected embodiments of the invention and are not therefore to be considered limiting of the scope of the invention. The invention will be described and explained with additional specificity and detail through the use of the accompanying drawings.

DETAILED DESCRIPTION OF THE INVENTION

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope. The presently preferred embodiments of the invention will be best understood by reference to the drawings, wherein like parts are designated by like numerals throughout. It will be readily understood that the components of the invention, as generally described and illustrated in the figures herein, could be arranged and designed in a wide variety of different configurations. Thus, the following more detailed description of the embodiments of the apparatus and method of the invention, as represented in FIGS. 1 through 6, is not intended to limit the scope of the invention, but is merely representative of presently preferred embodiments of the invention.

Figure 1:
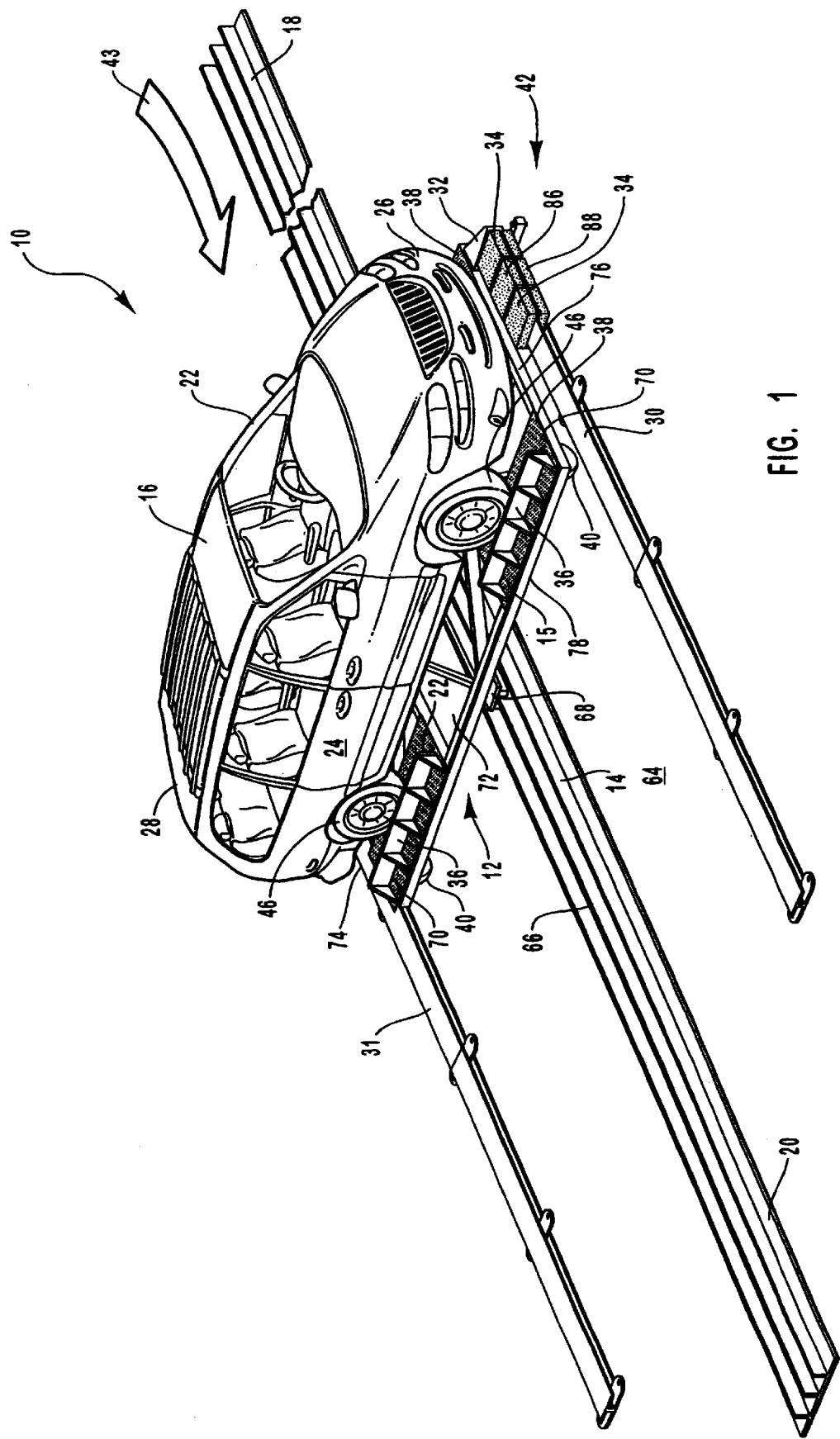
FIG. 1 is a perspective view of one embodiment of the rollover sled test device of the present invention with a vehicle positioned on the carriage.

With particular reference to FIG. 1, a rollover sled test device according to the present invention is generally designated 10. The rollover sled test device 10 includes a carriage 12 slidably mounted to a track 14. The carriage 12 slides upon the track 14 from a first track location 18 to a second track location 20.

One of skill in the art will appreciate that many variations of the track 14 may be used with the current invention. For example, in the illustrated embodiment, the carriage 12 is generally centered over a single track 14. The carriage 12 can also run on two or more tracks 14. The two or more tracks 14 can be positioned adjacent the ends of the carriage 12 or at another location that allows the carriage 12 to run smoothly from the first track location 18 to the second track location 20.

The track 14 can be mounted to a surface 64 such as the floor of a test facility. In the illustrated embodiment, the track 14 is elevated above the surface 64. However, the track 14 may be recessed within the surface 64.

A rail 66 extends upwardly from the track 14. The rail 66 allows the carriage 12 to maintain a straight line of travel upon the track 14. A slide 68 is mounted on the underside of the carriage 12 and is positioned over the rail 66. The slide 68 may contain wheels or bearings which reduce the friction of the slide 68 upon the rail 66. A lubricant may also be used to reduce the friction of the slide 68 upon the rail 66.

Wheels 40 are mounted to the underside of the carriage 12. The wheels are positioned to evenly distribute the weight of the carriage 12 with mounted vehicle 16 upon the surface 64.

The carriage 12 is configured to allow a vehicle 16 to be positioned on the upper surface 15 of the carriage 12. The carriage 12 has one or more platforms 38 on which the tires 46 of the vehicle 16 can rest. In the illustrated embodiment, four separate platforms 38 are positioned adjacent the corners 70 of the carriage 12. With the platforms 38 positioned in the corners 70 of the carriage 12, a large gap 72 is created between the platforms 38. The gap 72 will prevent the vehicle 16 from being driven or rolled on to the carriage 12. With a carriage 12 configured with a gap 72, the vehicle 16 is lifted onto the platforms 38 by a lifting device such as a crane or fork truck.

It may be advantageous to allow the vehicle 16 to be positioned on the carriage 12 without the use of a lifting device. Thus, in certain embodiments, the upper surface 15 of the carriage 12 has one or two continuous platforms 38 running from a first end 74 of the carriage 12 to a second end 76 of the carriage 12. The continuous platforms 38 allow the vehicle 16 to be rolled or driven onto the carriage 12. If the carriage 12 is too high above the test surface 64, a ramp can be used to roll the vehicle 16 onto the carriage 12.

The carriage 12 may be configured to have mounted thereon a complete, actual vehicle 16 with an actual suspension and working parts. The test results generated from the sled test device 10 using a complete, actual vehicle 16 will give a good indication how the vehicle 16 will perform under real world conditions with its actual suspension, tires, and weight. However, other incomplete vehicles 16 can be used with the test sled 10 without departing from the scope of the present invention.

The carriage 12 with mounted vehicle 16 is propelled from the first track location 18 to the second track location 20 by an accelerator 43 (indicated by an arrow). Different accelerators 43 capable of propelling the carriage 12 would be recognized by those of skill in the art. For example, in one presently preferred embodiment, a cable (not shown) is coupled to the carriage 12 by a detachable mechanism (not shown). The cable is then accelerated by a motor (not shown). When the carriage 12 reaches the desired velocity, the cable is detached and the carriage 12 continues down the track 14 at the desired velocity. The velocity of the carriage 12 can be varied from test to test to allow an observer to determine the speeds at which a given vehicle 16 may roll.

As the carriage 12 nears the second track location 20, a decelerator 42 slows and stops the carriage 12. The decelerator 42 can simulate the different types of pulses encountered under real world conditions that may cause a vehicle 16 to roll. For example, the decelerator 42 can deliver an abrupt pulse to rapidly stop the carriage 12. A longer and weaker deceleration pulse may be delivered to gradually brake the carriage 12. Alternatively, the decelerator 42 can deliver two or more deceleration pulses to simulate other real world situations.

It is possible for the vehicle 16 to merely rest upon the platforms 38 of the carriage 12 without being secured to the carriage 12. Because the vehicle 16 is not connected to the carriage 16, the vehicle's momentum can continue to drive the vehicle 16 in the direction of the second track location 20 after the carriage 12 is decelerated. If the momentum of the vehicle 16 is sufficiently large, the vehicle 16 will roll from the carriage 12. Thus, an observer may determine the speed and deceleration pulse needed to cause the vehicle 16 to roll, thereby determining the rollover threshold of the vehicle.

The rollover sled test device 10 can also be used to test safety devices mounted within the vehicle 16. For example, airbags and inflatable curtains are frequently installed in vehicles to prevent or reduce injury to a passenger. These devices inflate when a sensor detects an appropriate accident scenario and signals the devices to inflate. If the sensors incorrectly signal the device to inflate, the passenger may be injured by the forceful inflation of the airbag or curtain. Conversely, if the sensor does not signal the device to inflate in an accident, the passenger may not be fully protected. Therefore, it is important that the sensor be able to accurately detect an accident. Thus, the sensor can be mounted within the vehicle 16 and tested for its ability to sense and signal a rollover accident.

One or more stops 36 can be provided on the carriage 12 adjacent the location where the vehicle tires 46 will be positioned and near the front 78 of the carriage 12. The stops 36 function as a tripping device to trigger a rollover when the rollover threshold of the vehicle 16 is met. For example, in an actual rollover, the vehicle 16 skids sideways on a road until the tires 46 come in contact with the curb or other low, stationary object. When the tires 46 hit the curb, the vehicle 16 trips and begins a rollover. In other real-world rollovers, the vehicle 16 skids generally sideways in soil such as dirt, gravel, or sand. As the tires 46 of the vehicle 16 slide in the soil, they dig into the soil until a mass of dirt, gravel, or sand is built up. This mass of soil can also trip the vehicle 16 and cause a rollover event. The stops 36 of the carriage 12 function in a similar manner. As the carriage 12 is slowed, the tires 46 of the vehicle 16, push against the stops 36. If the rollover threshold of the vehicle 16 is met, the stops 36 trip the vehicle 16 which begins a rollover event.

In one presently preferred embodiment of the invention, the decelerator comprises one or more latches 32 mounted on the carriage 12. The latches 32 present a surface 33 which impacts one or more pads 34 slidably fixed to a deceleration track 30. The deceleration track 30 is configured to be able to completely decelerate the carriage 12. In a preferred configuration, the deceleration track 30 is about six meters long which is generally a length sufficient to completely decelerate the carriage 12 with mounted vehicle 16. The pads 34 exert a pressure on the deceleration track 30 such that as the latch 32 contacts a pad, the pads 34 rub against the deceleration track 30. The carriage is slowed by the friction of the pads 34 on the deceleration track 30.

The pressure of the pad 34 on the deceleration track 30 can be varied depending on the strength of the desired deceleration pulse. It is presently preferred that the pressure range from about 0 to about 1,000 PSI. The pressure required to slow the carriage 12 will vary depending on the mass of the vehicle 16, the mass of the carriage 12, the speed of the carriage 12, and other variables. Generally, a pressure of about 1,000 PSI, will provide about 10 G of deceleration force on a large vehicle such as a sport utility vehicle or a van. The carriage 12 with a large vehicle 16 will be abruptly stopped by the application of a deceleration force of about 10 G.

In the illustrated embodiment, a first deceleration track 30 and a second deceleration track 31 are provided at opposite ends 74, 76 of the carriage 12. Each of the deceleration tracks 30, 31 have pressurized pads 34 mounted thereon. In this embodiment, the carriage has two latches 32 mounted at opposite ends 74, 76 of the carriage 12. As described above, the latches 32 contact the pads 34 as the carriage 12 nears the second track location 20. The friction of the pads 34 on the deceleration tracks 30, 31 provides a deceleration force that slows and stops the carriage. With a pair of evenly spaced deceleration tracks 30, 31, the carriage 12 is uniformly decelerated at both ends 74, 76.

Where two or more pads 34 are used to decelerate the carriage 12, the pads 34 may be spaced along the deceleration track 30, 31. With the pads 34 spaced along the tracks 30, 31 the deceleration pulse delivered by one pad 34 may be completed before the second pad 34 is contacted and its deceleration pulse begins. The spacing of the pads 34 and deceleration pulse can more realistically simulate the sliding of a vehicle 16 on pavement or soil. If the pads 34 are not sufficiently spaced, the combined deceleration pulses generated from the pads 34 can cause the carriage 12 to abruptly stop, throwing the vehicle 16 into a roll even though the speed would not be sufficient to cause a roll in a real world situation.

Those of skill in the art will recognize many ways to construct the deceleration track 30, 31 and pads 34 without departing from the scope of the present invention. For example, the pads 34 can be constructed similar to the brake pads of an automobile. Thus, the pads 34 can be constructed from a metallic material, an organic material, or a combination thereof.

In certain embodiments, the deceleration track 30 may correspond to the primary track 14. The pads 34 can thus be mounted directly to the primary track 14. The latch 32 is mounted on the carriage 12 adjacent the slide 68. Thus, as the carriage 12 nears the second track location 20, the latch 32 will contact the pads on the primary track 14 slowing and stopping the carriage 12.

The pressure of the pads 34 on the track 30, 31 may be varied to simulate different crash scenarios. The pressure can be controlled though a number of means. For example, the pressure may be controlled by tightening or loosening a bolt that fastens an upper portion 86 of a pad 34 to a lower portion 88 of a pad. As the bolt is tightened the pressure is increased, and as the bolt is loosened the pressure is decreased. Alternatively, a hydraulic or pneumatic piston (not shown) may be used to adjust the pressure.

It may be desirable to have each pad 34 exert a different pressure upon the track 30, 31 to simulate the random and often sporadic deceleration pulses generated under actual conditions. Thus, the pads 34 may be independently adjustable allowing each pad 34 to have a different pressure. Alternatively, the pads 34 exert the same pressure on the deceleration track 30, 31. In these configurations, the pads 34 may be connected by a common pressure adjustment mechanism.

Figure 2:
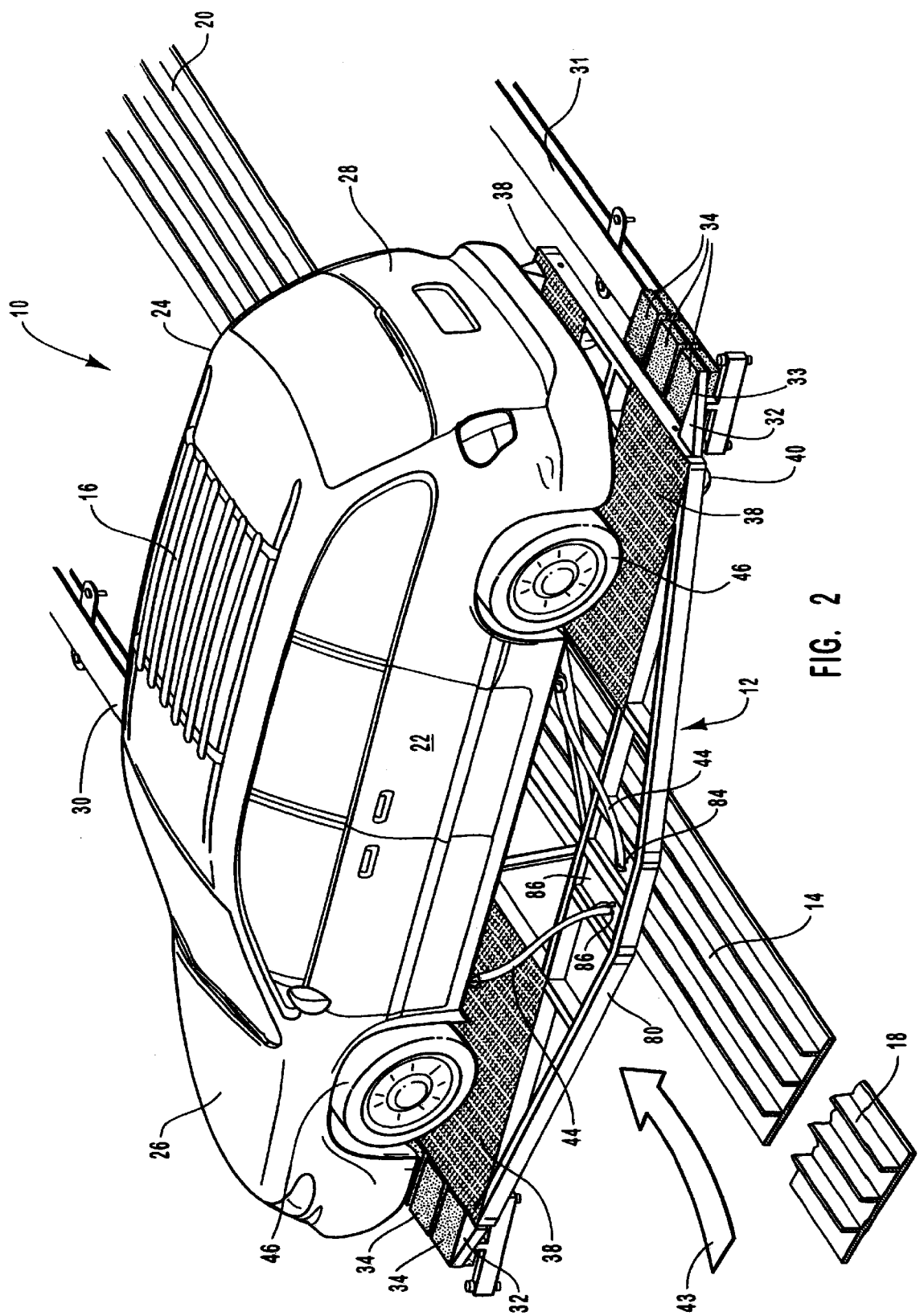
FIG. 2 is a is a perspective view from a reverse angle of embodiment of the rollover sled test device of FIG. 1, with a vehicle positioned on the carriage.

Referring now to FIG. 2, one embodiment of the rollover sled 10 is illustrated from the rear 80 of the carriage 12. The vehicle 16 is positioned on the carriage 12 with the tires 46 resting on platforms 38. As discussed above, when the carriage 12 is decelerated and the rollover threshold of the vehicle 16 is met, the vehicle 16 will roll from the carriage 12. The rolling vehicle 16 can be severely damaged when in rolls from the carriage 12 and hits the surface 64, track 14, decelerator 42, or carriage 12 itself. Because an actual vehicle 16 is used, such destructive tests can become extremely costly and therefore cannot be repeated many times. Moreover, the rolling vehicle 16 may cause considerable damage to the test sled 10 as it crashes into the carriage 12, track 14, and decelerator 42.

To overcome the problems associated with the destructive rolling of the vehicle 16 and still maintain the usefulness of the test, one or more tethers 44 may be fastened between the carriage 12 and the vehicle 16. The tethers 44 allow the vehicle 16 to begin the rollover event sufficiently to determine the rollover threshold of the vehicle 12, but prevent the destructive completion of the rollover event.

As illustrated in FIG. 2, a set of two tethers 44 are fastened to the carriage 12 near the rear 80 of the carriage 12. Support plates 84 are secured to the carriage 12, and the tethers 44 are secured to the carriage 12 by fasteners 86. The tethers 44 extend from the support plates 84 to the underside of the vehicle 16.

The tethers 44 are configured to allow the vehicle 16 to tip toward one side with one set of wheels 46 resting on the platforms 38 and the other set of wheels 46 in mid air. The tethers 44 can be made from an elastic material which will stretch to allow the vehicle 16 to tip and contract to bring the vehicle 16 back with all wheels 46 resting on the platforms 38. Alternatively, the tethers 44 can be made from material with little elasticity such as ropes, cables, chains, or pipes.

Figure 3:
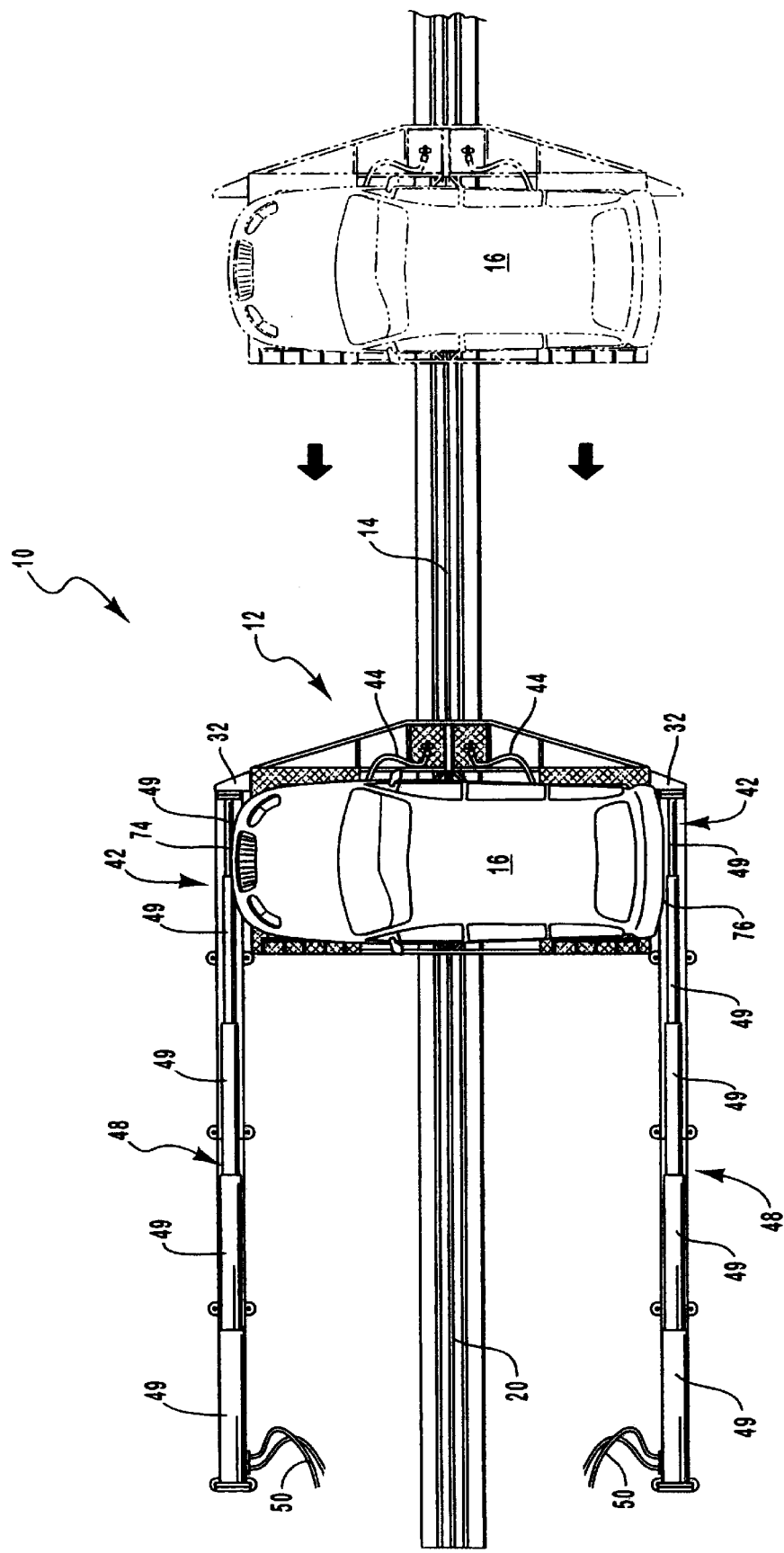
FIG. 3 is a perspective view of an alternate embodiment of the rollover sled test device of the present invention.

Referring now to FIG. 3, the rollover sled test device 10 is illustrated with one of the many alternative decelerators 42 that can be used to arrest the carriage 12. As illustrated, the latches 32 are positioned adjacent opposite ends 74, 76 of the carriage 12. The latches 32 are configured to impact retracting syringes 48 or shock absorbers 48. The syringes/shock absorbers 48 are made from two or more telescoping sections 49. The sections 49 slide within each other and the syringe/shock absorber 48 is compressed by the impact of the latch 32.

The syringes/shock absorbers 48 can be pneumatic or hydraulic. The syringes/shock absorbers 48 exert a pressure which may be varied by infusing or removing additional air or fluid from the syringe/shock absorber 48 through tubes 50.

As the carriage 12 nears the second track location 20, the latches contact the syringes/shock absorbers 48. The sections 49 of the syringe/shock absorber 48 are compressed until the carriage 12 is stopped. If it is desired to increase the stopping distance of the carriage 12 and lessen the deceleration pulse, the pressure of the syringe/shock absorber 48 is decreased. Conversely, to deliver a stronger deceleration pulse to the carriage 12, the pressure within the syringe/shock absorber 48 is increased.

Figure 4:
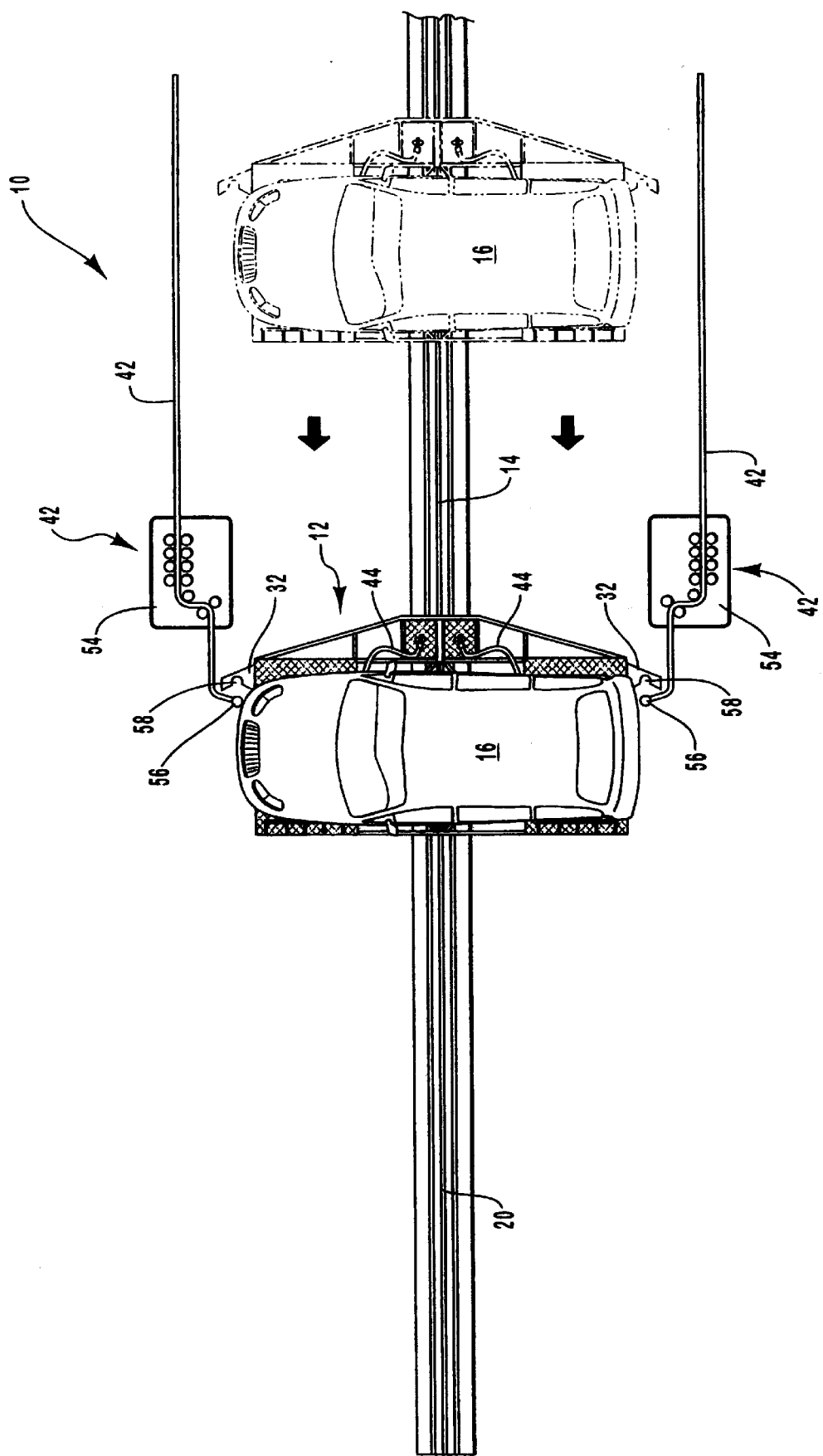
FIG. 4 is a perspective view of an alternate embodiment of the rollover sled test device of the present invention.

Referring to FIG. 4, the rollover sled test device 10 is illustrated with another alternative decelerator 42. In this embodiment, the carriage 12 is decelerated as latches 32 impact one or more metal bent bars 42 being pulled through a set of rollers 54. The latch 32 has a notch 58 which grabs onto the end of the bar 56 as the carriage 12 nears the second track location. The bent metal bar 42 is pulled through the rollers 54 as the carriage 12 is slowed.

The deceleration pulse can be varied by selecting a bar 42 which requires a lesser or greater force to be bent. If the bar 42 requires a large force to bend, the carriage 12 will be more abruptly stopped because the deceleration pulse will be greater. If the bar requires a small force to be bent, the deceleration pulse will be smaller and the carriage 12 will have a longer stopping time.

Figure 5:
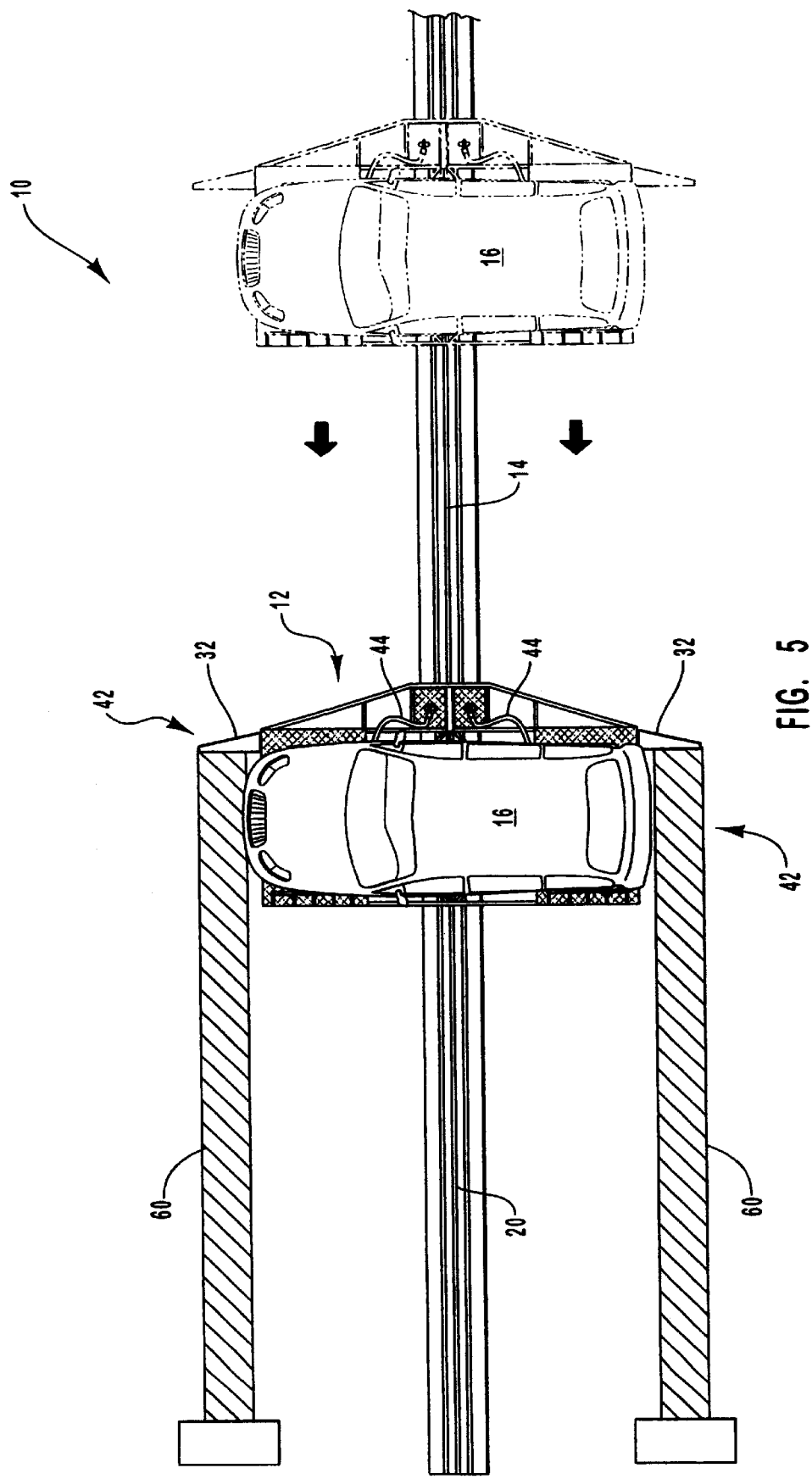
FIG. 5 is a perspective view of an alternate embodiment of the rollover sled test device of the present invention.

Referring to FIG. 5, another embodiment of a rollover test sled device 10 is illustrated with a different decelerator 42. In this embodiment, latches 32 on the carriage 12 impact a length 60 of crushable material such as hex cell. As the latches impact the crushable material 60, the carriage 12 is slowed and stopped. The deceleration pulse can be increased or decreased by selecting a material 60 which requires a greater or lesser force to crush.

Figure 6:
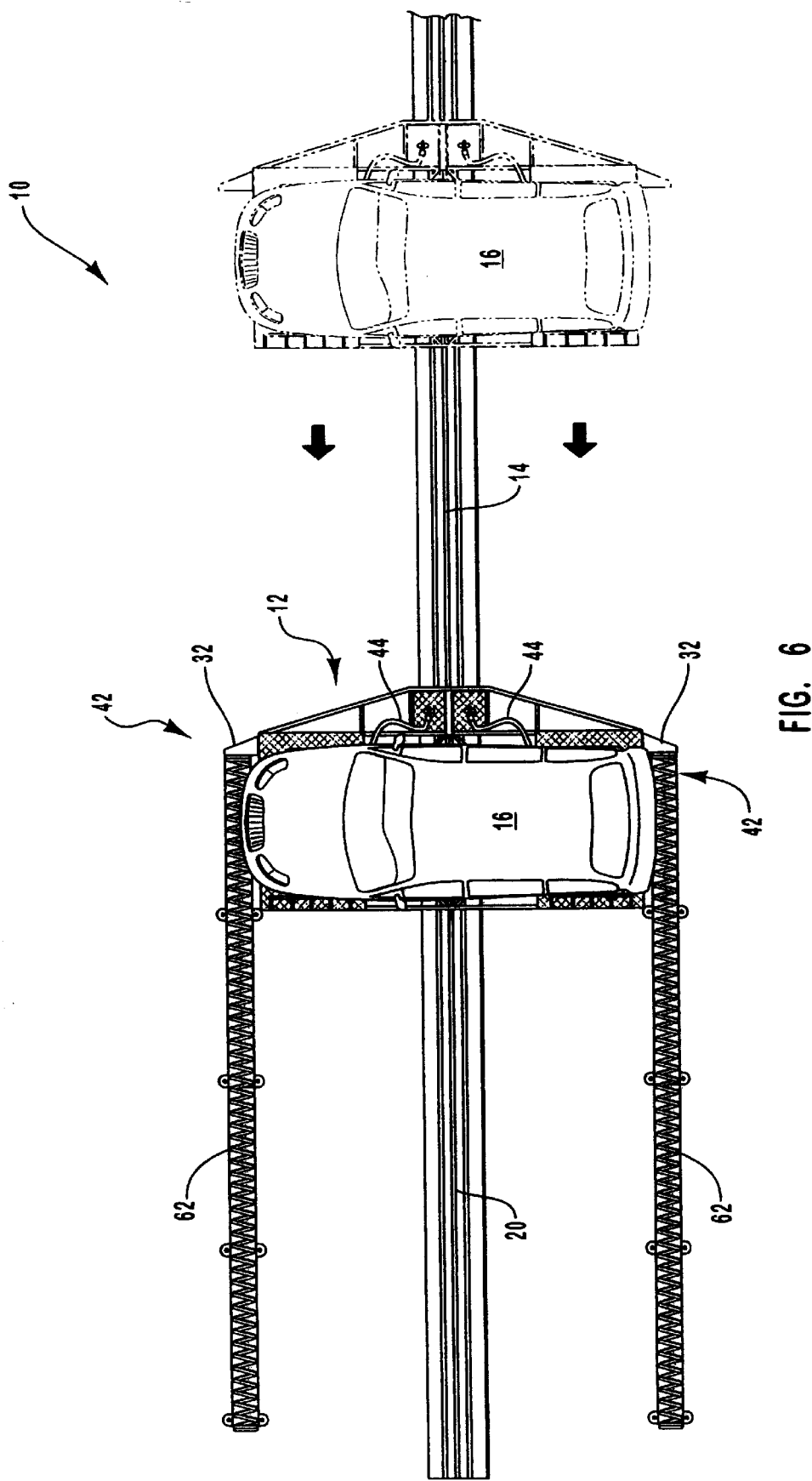
FIG. 6 is a perspective view of an alternate embodiment of the rollover sled test device of the present invention.

Referring now to FIG. 6, an alternative embodiment of the sled test device 10 is illustrated with another alternative decelerator 42. The carriage 12 has one or more latches 32 which are configured to contact springs 62 as the carriage 12 nears the second track location. The springs 62 can be in tension, compression, or a neutral state. As the latches contact a spring 62 in tension or a neutral state, the spring 62 is compressed causing the carriage 12 slow and stop. If a spring 62 in compression is used, the spring is released as the latches 32 contact the springs 62. The pulse generated by the released compressed spring 62 slows and stops the carriage 12. As before, the deceleration pulse can be varied, by the amount of compression or tension or by the strength of the spring 62.

The decelerators 42 disclosed and illustrated herein, are provided as examples of the many ways the carriage 12 may be decelerated. Those of skill in the art will recognize other decelerators 42 that may be used with the rollover sled test device 10 of the present invention. The alternative decelerators 42 described herein can be combined with each other and with other decelerators known by those of skill in the art without departing from the scope of the invention.

Referring to FIGS. 1–6, the present invention also relates to a method of testing the rollover threshold of a vehicle 16. The method is performed by positioning a vehicle 16 on a carriage 12 of the rollover sled test device 10 of the present invention. The vehicle 16 is laterally positioned on the carriage 12 with a first side 22 of the vehicle 16 facing a first track location 18 and a second side 24 of the vehicle 16 facing a second track location 20. The tires 46 of the vehicle 16 rest on the platform 38 of the carriage 12. The front of the vehicle is designated 26 and the rear of the vehicle is designated 28.

Once the vehicle 16 is positioned on the carriage 12, the carriage 12 is propelled from the first track location 18 to the second track location 20. The carriage 12 and the vehicle 16 possess a momentum which carry the carriage 12 and the vehicle 16 in the direction of the second track location 20. When the carriage 12 and the vehicle 16 near the second track location 20, the carriage 12 is decelerated by a decelerator 42. As the movement of the carriage is arrested, the momentum of the vehicle 16 may cause the vehicle 16 to initiate a rollover event.

The carriage 12 may have a stop 36 for imposing a rotational force on the vehicle 16. In this configuration, the method may further comprise impacting the vehicle 16 into the stop 36. The impacting can take place spontaneously as the tires 46 are carried into the stop 36 by the momentum of the vehicle 16. Alternatively, the stops can be mechanically thrust in the tires 46 of the vehicle 16.

Because an actual rollover will severely damage the vehicle 16 and potentially damage the rollover sled test device 10, the method can also comprise tethering the vehicle 16 to the carriage 12. When the carriage 12 is stopped by the decelerator, the vehicle 16 can tip onto a set of tires 46, but will not destructively roll from the carriage 12.

From the above discussion, it will be appreciated that the present invention provides a test device for determining the rollover threshold of a vehicle. The device can test an actual vehicle with all its working parts including the suspension and tires. Because the test device uses a non-destructive method, the cost of the test is reduced, and multiple tests can be run to obtain reliable, reproducible data.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A rollover sled test device comprising:
   a carriage slidably mounted to a track, the carriage configured to receive a laterally mounted vehicle;
   an accelerator for propelling the carriage on the track;
   the carriage moving under force of the accelerator from a first track location to a second track location; and
   a decelerator positioned near the second track location that arrests the movement of the carriage such that after the carriage has been decelerated, the momentum of the vehicle continues to carry the vehicle in the direction of the second track location and initiates a rollover event.

2. The rollover sled test device of claim 1, wherein the carriage further comprises a stop for imposing a rotational force on the vehicle.

3. The sled test device of claim 1, wherein the carriage further comprises wheels for supporting the carriage.

4. The sled test device of claim 1, further comprising a tether attached between the vehicle and the carriage to prevent destruction of the vehicle.

5. The sled test device of claim 1, wherein the decelerator comprises a latch attached to the carriage configured to contact at least one pad on a deceleration track.

6. The sled test device of claim 5, wherein the deceleration track is at least about 6 meters long.

7. The sled test device of claim 5, wherein the at least one pad is configured to exert a pressure on the track.

8. The sled test device of claim 7, wherein the pressure of the pad on the deceleration track is adjustable.

9. The sled test device of claim 7, wherein the pressure is from about 0 to about 1,000 PSI.

10. The sled test device of claim 1, wherein the decelerator comprises a deceleration track.

11. The sled test device of claim 10, wherein the decelerator comprises a latch attached to the carriage, the latch configured to contact at least two pads on the deceleration track.

12. The sled test device of claim 11, wherein the at least two pads are positioned to create distinct deceleration pulses, each pulse being substantially completed before the next pulse begins.

13. The sled test device of claim 11, wherein the at least two pads are configured to exert a pressure on the track.

14. The sled test device of claim 13, wherein the pressure of each pad on the deceleration track is separately adjustable.

15. The sled test device of claim 11, wherein the pressure of each pad on the deceleration track is from about 0 to about 1,000 PSI.

16. The sled test device of claim 11, wherein the decelerator further comprises a second latch attached to the carriage, the second latch contacting at least one pad on a second deceleration track.

17. The sled test device of claim 1, wherein the decelerator comprises one or more bent metal bars configured to be pulled through a set of rollers, the one or more bent metal bars configured to contact one or more latches attached to the carriage.

18. The sled test device of claim 1, wherein the decelerator comprises one or more hydraulic syringes configured to impact one or more latches attached to the carriage.

19. The sled test device of claim 1, wherein the decelerator comprises one or more pneumatic shock absorbers configured to impact one or more latches attached to the carriage.

20. The sled test device of claim 1, wherein the decelerator comprises one or more hydraulic shock absorbers configured to impact one or more latches attached to the carriage.

21. The sled test device of claim 1, wherein the decelerator comprises contacting the sled with one or more springs.

22. A rollover sled test device comprising:
  a carriage slidably mounted to a track, the carriage configured to receive a mounted vehicle;
  an accelerator for propelling the carriage on the track;
  the carriage moving under force of the accelerator from a first track location to a second track location; and
  a decelerator that arrests the movement of the carriaae such that after the carriage has been decelerated, the momentum of the vehicle continues to carry the vehicle in the direction of the second track location and initiates a rollover event, the decelerator comprising a latch attached to the carriage, the latch configured to contact at least one pad on a deceleration track.

23. The sled test device of claim 22, wherein the deceleration track is at least about 6 meters long.

24. The sled test device of claim 22, wherein the decelerator further comprises a second latch attached to the carriage, the second latch configured to contact at least one pad on a second deceleration track.

25. The sled test device of claim 22, wherein the carriage further comprises a stop for imposing a rotational force on the vehicle.

26. The sled test device of claim 22, further comprising a tether attached between the carriage and the vehicle to prevent the destruction of the vehicle.

27. A rollover sled test device comprising:
  a carriage slidably mounted to a track, the carriage configured to receive a laterally mounted vehicle;
  an accelerator for propelling the carriage on the track;
  the carriage moving under force of the accelerator from a first track location to a second track location;
  a decelerator for arresting the movement of the carriage, the decelerator comprising a set of latches attached to the carriage, the set of latches configured to contact at least one pad on a set of deceleration tracks; and
  a stop for imposing a rotational force on the vehicle.

28. The sled test device of claim 27, wherein the deceleration track is at least about 6 meters long.

29. The sled test device of claim 27, wherein the sled further comprises wheels for supporting the carriage.

30. The sled test device of claim 27, further comprising a tether attached between the carriage and the vehicle to prevent the destruction of the vehicle.

31. A method for testing the rollover threshold of a vehicle comprising:
  positioning a vehicle on a rollover sled test device comprising a carriage configured to receive a mounted vehicle, the carriage slidably mounted to a track, an accelerator for propelling the carriage on the track, the carriage moving under force of the accelerator from a first track location to a second track location and a decelerator for arresting the movement of the carriage;
  propelling the carriage on the track from the first track location to the second track location; and
  decelerating the rollover test sled to arrest the movement of the carriage, wherein after the carriage has been decelerated, the momentum of the vehicle continues to carry the vehicle in the direction of the second track location and induces a rollover event.

32. The method for testing the rollover threshold of a claim 31, wherein the sled further comprises a stop for imposing a rotational force on the vehicle, the method further comprising impacting the vehicle into the stop.

33. The method for testing the rollover threshold of a claim 31, further comprising the step of tethering the vehicle to the sled to prevent rollover of the vehicle.

34. The method for testing the rollover threshold of a claim 31, wherein the decelerator comprises a latch attached to the carriage, the latch configured to contact at least one pad on a deceleration track.

* * * * *